United States Patent
Allamanche et al.

(10) Patent No.: US 7,478,045 B2
(45) Date of Patent: Jan. 13, 2009

(54) METHOD AND DEVICE FOR CHARACTERIZING A SIGNAL AND METHOD AND DEVICE FOR PRODUCING AN INDEXED SIGNAL

(75) Inventors: Eric Allamanche, Nürnberg (DE); Jürgen Herre, Buckenhof (DE); Oliver Hellmuth, Erlangen (DE); Thorsten Kastner, Reitsch (DE)

(73) Assignee: M2ANY GmbH, Garching (DE)

( * ) Notice: Subject to any disclaimer, the term of this patent is extended or adjusted under 35 U.S.C. 154(b) by 853 days.

(21) Appl. No.: 10/484,513

(22) PCT Filed: Jul. 15, 2002

(86) PCT No.: PCT/EP02/07848

§ 371 (c)(1),
(2), (4) Date: Aug. 9, 2004

(87) PCT Pub. No.: WO03/009273

PCT Pub. Date: Jan. 30, 2003

(65) Prior Publication Data

US 2004/0267522 A1 Dec. 30, 2004

(30) Foreign Application Priority Data

Jul. 16, 2001 (DE) ................. 101 34 471

(51) Int. Cl.
G10L 15/02 (2006.01)
G10L 19/02 (2006.01)
(52) U.S. Cl. .................. 704/236; 704/200; 704/205; 704/207; 704/238
(58) Field of Classification Search ............... 704/236, 704/205, 207, 238, 200
See application file for complete search history.

(56) References Cited

U.S. PATENT DOCUMENTS 5,210,820 A 5/1993 Kenyon ................ 395/2

(Continued)

FOREIGN PATENT DOCUMENTS

DE 195 05 435 2/1995

(Continued)

OTHER PUBLICATIONS

Wang et al., "Multimedia Media Analysis", IEEE Signal Processing Magazine, Nov. 2000, pp. 12-36.*

(Continued)

*Primary Examiner*—David R Hudspeth
*Assistant Examiner*—Abdelali Serrou
(74) *Attorney, Agent, or Firm*—Michael A. Glenn; Glenn Patent Group (57) ABSTRACT

In a method for characterizing a signal representing an audio content a measure is determined for a tonality of the signal, whereupon a statement is made about the audio content of the signal on the basis of the measure for the tonality of the signal. The measure for the tonality is derived from a quotient whose numerator is the mean of the summed values of spectral components of the signal exponentiated with a first power and whose denominator is the mean of the summed values of spectral components exponentiated with a second power, the first and second powers differing from each other. The measure for the tonality of the signal for the content analysis is robust in relation to a signal distortion, due e.g. to MP3 coding, and has a high correlation with the content of the analyzed signal.

22 Claims, 3 Drawing Sheets

U.S. PATENT DOCUMENTS

| | | | |
|---|---|---|---|
| 5,402,339 | A | 3/1995 | Nakashima et al. .... 364/419.19 |
| 5,510,572 | A | 4/1996 | Hayashi et al. ............... 86/609 |
| 5,918,203 | A * | 6/1999 | Herre et al. ................. 704/205 |
| 5,918,223 | A * | 6/1999 | Blum et al. ..................... 707/1 |
| RE36,714 | E * | 5/2000 | Brandenburg et al. ....... 704/227 |
| 6,185,527 | B1 * | 2/2001 | Petkovic et al. ............. 704/231 |
| 7,031,980 | B2 * | 4/2006 | Logan et al. ............. 707/104.1 |
| 7,081,581 | B2 * | 7/2006 | Allamanche et al. .......... 84/616 |
| 7,277,766 | B1 * | 10/2007 | Khan et al. ................... 700/94 |
| 7,295,977 | B2 * | 11/2007 | Whitman et al. ............ 704/236 |
| 2003/0233234 | A1 * | 12/2003 | Truman et al. .............. 704/256 |
| 2003/0233236 | A1 * | 12/2003 | Davidson et al. ............ 704/258 |

FOREIGN PATENT DOCUMENTS

WO     WO 01/04870     1/2001

OTHER PUBLICATIONS

Zhang et al. "Audio Content Analysis for Online Audiovisual Data Segmentation and Classification", IEEE Transactions on Speech and Audio Processing, vol. 9, No. 4, May 2001, pp. 441-457.*

* cited by examiner

METHOD AND DEVICE FOR CHARACTERIZING A SIGNAL AND METHOD AND DEVICE FOR PRODUCING AN INDEXED SIGNAL

BACKGROUND OF THE INVENTION

1. Field of the Invention

The present invention relates to the characterization of audio signals in respect of their content and in particular to a concept for classifying or indexing audio pieces in respect of their content so as to make an investigation of such multimedia data possible.

2. Description of the Related Art

In the last few years the availability of multimedia data material, i.e. of audio data, has greatly increased. This development has been conditioned by a number of technical factors. These technical factors include e.g. the wide availability of the internet, the wide availability of powerful computers and the wide availability of powerful methods for data compression, i.e. source coding, of audio data. An example of this is MPEG ½ layer 3, also known as MP3.

The gigantic amounts of audiovisual data which are available worldwide, e.g. from the internet, necessitate concepts which enable these data to be assessed, catalogued and administered on the basis of content criteria. There is a need to search for and find multimedia data by targeting them precisely by entering sensible criteria.

This requires the use of so-called "content-based" techniques, which extract so-called "features", which represent important characteristic content properties of the signal of interest, from the audiovisual data. On the basis of such features, or combinations of such features, similarities or commonalities between the audio signals can be deduced. This process is normally accomplished by comparing the extracted feature values from various signals, also called "pieces" here, or by setting them in relation to one another.

The U.S. Pat. No. 5,918,223 discloses a method for the content-based analysis, storage, retrieval and segmentation of audio information. An analysis of audio data produces a set of numerical values, which is also known as the feature vector, and which can be used to classify the similarity between individual audio pieces, which are typically stored in a multimedia data bank or in the world wide web, and to arrange them in ranking order.

The analysis also makes it possible to describe user-defined categories of audio pieces based on an analysis of a set of audio pieces which are all members of a user-defined category. The system is capable of finding individual tone sections within a longer tone piece, thus making it possible for the audio recording to be automatically segmented into a series of shorter audio segments.

The loudness of a piece, the pitch, the brightness, the bandwidth and the so-called mel-frequency-cepstral-coefficients (MFCCs) at periodic intervals in the audio piece are used as features for characterizing or classifying audio pieces in respect of their content. The values per block or frame are stored and the first derivative is formed. Specific statistical values are then calculated, e.g. the mean value or the standard deviation, for each of these features including the first derivatives of the same, to describe a variation with time. This set of statistical values forms the feature vector. The feature vector of the audio piece is stored in a data bank in association with the original file. A user can then access the data bank to retrieve the relevant audio pieces.

The data bank system is capable of quantifying the distance in an n-dimensional space between two n-dimensional vectors. It is also possible to produce categories of audio pieces by specifying a set of audio pieces which belong to the same category. Examples of such categories are bird chirping, rock music, etc. The user is enabled to search through the audio data bank using specific methods. The result of such a search is a list of tone files which are listed in order according to their distance from the specified n-dimensional vector. The user can search through the data bank in terms of similarity features, in terms of acoustic or psychoacoustic features, in terms of subjective features or in terms of special noises, e.g. the humming of bees.

The technical publication "Multimedia Content Analysis", Yao Wang et al., IEEE Signal Processing Magazine, November 2000, pp. 12 to 36, discloses a similar concept for characterizing multimedia pieces. Proposed features for classifying the content of a multimedia piece are time domain features or frequency domain features. These include the loudness, the pitch as the fundamental frequency of an audio signal form, spectral features, e.g. the energy content of a band as a fraction of the total energy content, threshold frequencies in the spectral profile, etc. In addition to short-time features, which relate to the cited quantities per block of sampled audio signal values, long-time features, which relate to a longer duration of the audio piece, are also proposed.

For characterizing audio pieces various categories are proposed, e.g. animal noises, bell noises, crowd noises, laughter, machine noises, musical instruments, male speech, female speech, telephone noises or water noises.

A problem in selecting the features used is that the computational outlay for extracting a feature should be moderate in order to achieve a rapid characterization, but on the other hand the feature should be characteristic for the audio signal in that two different pieces also exhibit distinctive features.

A further problem is the robustness of the feature. In the cited concepts robustness criteria are not discussed. If an audio piece is characterized immediately after being produced in the tone studio and is provided with an index which represents the feature vector of the piece and which captures, essentially, the essence of the piece, the probability is relatively high that this piece will be recognized again if the same undistorted version of the piece is subjected to the same method, i.e. the same features are extracted and the feature vector is then compared in the data bank with a plurality of feature vectors of various pieces.

A problem arises, however, if the audio piece is distorted prior to being characterized, so that the signal to be characterized is no longer identical to the original signal but has the same content. Someone who knows a song will still recognize this song when it is impaired by noise, when it is louder or quieter or when it is played at a different pitch than when it was originally recorded. A further distortion might e.g. have arisen due to data compression involving loss, e.g. by means of a coding method according to an MPEG standard such as MP3 or AAC.

If a distortion or data compression also causes the feature to be substantially impaired, this would mean that the essence gets lost, while a person can still recognize the content of the piece.

SUMMARY OF THE INVENTION

It is the object of the present invention to provide a concept to improve the robustness and the computing efficiency.

The present invention is a method for characterizing a signal representing an audio content, comprising the following steps:

determining a measure for a tonality of the signal; and
making a statement about the audio content of the signal on the basis of the measure for the tonality of the signal, wherein the measure for the tonality is derived from a quotient $F_{x,y}$ which is defined as follows:

$$F_{x,y} = \frac{\sqrt[x]{\frac{1}{N}\sum_{n=0}^{N-1} X(n)^x}}{\sqrt[y]{\frac{1}{N}\sum_{n=0}^{N-1} X(n)^y}}$$

wherein X(n) is a spectral component of the signal for a numeration index n, wherein n equal to 0 represents a lower frequency index, wherein N represents an upper frequency index, wherein x is the first power and y the second power and wherein the first and second powers are different.

The present invention is a method for producing an indexed signal which has an audio content, comprising the following steps:
determining a measure for a tonality of the signal; and
recording the measure for the tonality as the index associated with the signal, said index indicating the audio content of the signal, wherein the measure for the tonality is derived from a quotient $F_{x,y}$ which is defined as follows:

$$F_{x,y} = \frac{\sqrt[x]{\frac{1}{N}\sum_{n=0}^{N-1} X(n)^x}}{\sqrt[y]{\frac{1}{N}\sum_{n=0}^{N-1} X(n)^y}}$$

wherein X n) is a spectral component of the signal for a numeration index n, wherein n equal to 0 represents a lower frequency index, wherein N represents an upper frequency index, wherein x is the first power and y the second power and wherein the first and second powers are different.

The present invention is a device for characterizing a signal representing an audio content, comprising a unit for determining a measure for a tonality of the signal and a unit for making a statement about the audio content of the signal on the basis of the measure for the tonality of the signal, wherein the measure for the tonality is derived from a quotient $F_{x,y}$ which is defined as follows:

$$F_{x,y} = \frac{\sqrt[x]{\frac{1}{N}\sum_{n=0}^{N-1} X(n)^x}}{\sqrt[y]{\frac{1}{N}\sum_{n=0}^{N-1} X(n)^y}}$$

wherein X(n) is a spectral component of the signal for a numeration index n, wherein n equal to 0 represents a lower frequency index, wherein N represents an upper frequency index, wherein x is the first power and y the second power and wherein the first and second powers are different.

The present invention is a device for producing an indexed signal which has an audio content, comprising a unit for determining a measure for a tonality of the signal and a unit for recording the measure for the tonality as the index associated with the signal, said index indicating the audio content of the signal, wherein the measure for the tonality is derived from a quotient $F_{x,y}$ which is defined as follows:

$$F_{x,y} = \frac{\sqrt[x]{\frac{1}{N}\sum_{n=0}^{N-1} X(n)^x}}{\sqrt[y]{\frac{1}{N}\sum_{n=0}^{N-1} X(n)^y}}$$

wherein X(n) is a spectral component of the signal for a numeration index n, wherein n equal to 0 represents a lower frequency index, wherein N represents an upper frequency index, wherein x is the first power and y the second power and wherein the first and second powers are different.

When choosing the feature for characterizing or indexing a signal, according to the present invention particular attention should be paid to the robustness of the signal in the face of distortions. The usefulness of features or feature combinations depends on the degree to which they are modified by irrelevant changes, e.g. due to an MP3 coding.

The tonality of the signal is used as a feature for characterizing or indexing signals. It turns out that the tonality of a signal, i.e. the property that a signal has an uneven spectrum with distinctive lines or has a spectrum with lines of the same height, is robust in respect of distortions of the usual kind, e.g. distortions due to a loss-associated coding method such as MP3. Essentially the spectral appearance of the signal as it relates to the individual spectral lines or groups of spectral lines is taken as the essence of the signal. The tonality also provides a high degree of flexibility in respect of the computational outlay which is needed to establish the measure of tonality. The measure of tonality can be derived from the tonality of all the spectral components or from the tonality of groups of spectral components, etc. Furthermore, tonalities of successive short-time spectra of the investigated signal can be used either individually or after weighting or after statistical evaluation.

The tonality, i.e. the noisy or tonal nature of a signal, is a quantity which depends on the content of the audio signal and which is largely uninfluenced by various types of distortion. A concept for characterizing or indexing signals which is based on a tonality measure therefore provides robust subsequent recognition since the essential tonality of a signal is not altered to such an extent as to be unrecognizable when the signal is distorted.

A distortion is e.g. a transmission of the signal from a loudspeaker to a microphone over an air transmission channel.

The robustness of the tonality feature as regards compression methods involving loss is important. It has been shown that the tonality measure of a signal is not affected or scarcely affected by a loss-afflicted data compression e.g. according to one of the MPEG standards. In addition, a recognition feature based on the tonality of the signal provides a sufficiently good essence for the signal, so that two different audio signals also differ sufficiently in their tonality measure. The content of the audio signal is therefore strongly correlated with the tonality measure.

One advantage of the present invention therefore is that the tonality measure of the signal is robust as regards disturbed, i.e. distorted, signals. This robustness exists in particular with regard to a filtering, i.e. equalization, dynamic compression, a loss-afflicted data reduction, e.g. MPEG-½ layer 3, an analog transmission, etc. Furthermore, the tonality property of a signal provides high correlation with the content of the signal.

The present invention is also based on the finding that the measure for the tonality of a signal is particularly robust and can be determined with minor computational effort if the measure for the tonality is derived from a quotient whose numerator is the mean value of the spectral components of the signal raised to a first power and whose denominator is the mean value of the spectral components of the signal raised to a second power, the first and second powers being different. The mean value is formed by exponentiating a number of spectral components in the numerator with the first power and then summing them, dividing by the number of spectral components, and then finally extracting the root, the order of the root corresponding to that of the power. The same process of forming the mean value is performed in the denominator, but using a different power.

Since only squares, third powers, fourth powers, i.e. nth powers, have to be formed, and these exponentiated spectral components are then summed, problems arising when products are computed are avoided. To remain in the numerically available number space when large products are involved, logarithms are formed, the logarithms are summed and the sum is then exponentiated. This is a complicated procedure which is avoided for the tonality features in the present invention.

On the other hand, multiplications of spectral components or of exponentiated spectral components are inadequately robust in that, independently of the value of the individual spectral components, the product of a number of components will be equal to 0 or will be very small if just a single spectral component is equal to 0 or is very small.

On the other hand, the fact that the exponent in the numerator and the exponent in the denominator are different means that the quotient for flat spectra, i.e. signals with relatively small tonality, is equal to 1 or is close to 1, while the quotient for jagged spectra, i.e. spectra which are substantially tonal, is either greater than 1 when the exponent in the numerator is greater than the exponent in the denominator or is less than 1 when the exponent in the denominator is greater than the exponent in the numerator of the quotient or, expressed generally, differs from "1".

Furthermore, it has been shown that the quotient, from which the measure for the tonality is either derived directly or by forming the mean value or by variance calculation over a number of blocks or frequency bands which follow one another sequentially in time with or without gaps, exhibits a high degree of robustness, particularly as regards limited signal variations. An exemplary limited signal variation is a change in the signal sampling rate. A change in the signal sampling rate clearly manifests itself when e.g. a record or a tape is played somewhat faster or slower. Also, since a tonality measure is calculated without using a product, the tonality measure cannot be manipulated intentionally or unintentionally, e.g. by setting a single spectral component equal to 0, so that, regardless of the rest of the spectral profile, the product in which the spectral component which has been set to 0 appears is also equal to 0. This could result in a marked reduction in the recognition performance of a system which is based on a tonality measure when faced with large deviations.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
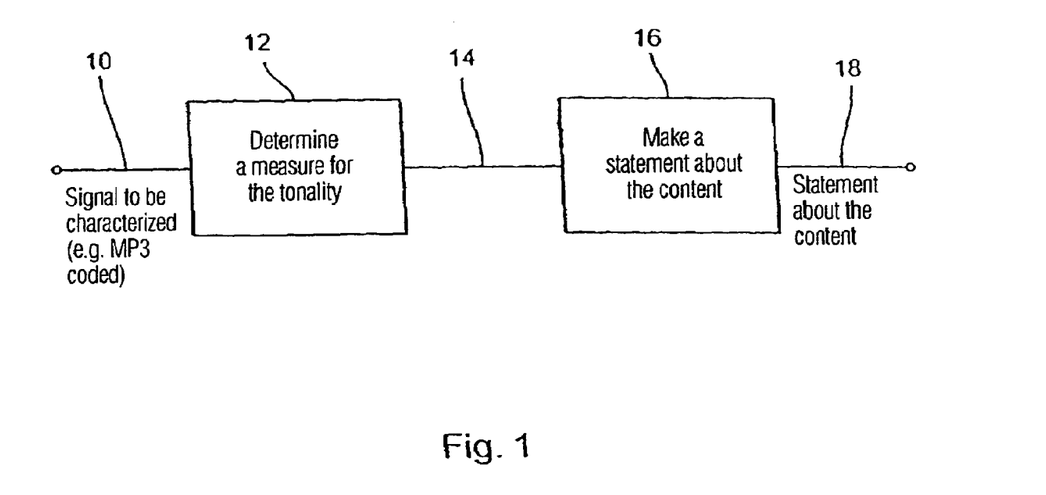
FIG. 1 shows a basic block diagram of a device for characterizing a signal.

FIG. 1 shows a basic block diagram of a device for characterizing a signal representing an audio content. The device includes an input 10 via which the signal to be characterized can be entered. The signal to be characterized might e.g. have been subjected to a loss-associated audiocoding with respect to an original signal. The signal to be characterized is fed into a unit 12 for determining a measure for the tonality of the signal. The measure for the tonality of the signal is passed to a unit 16 for making a statement about the content of the signal via a connecting line 14. The unit 16 is designed to make this statement on the basis of the measure for the tonality of the signal supplied by the unit 12 and delivers this statement about the content of the signal to an output 18 of the system.

Figure 2:
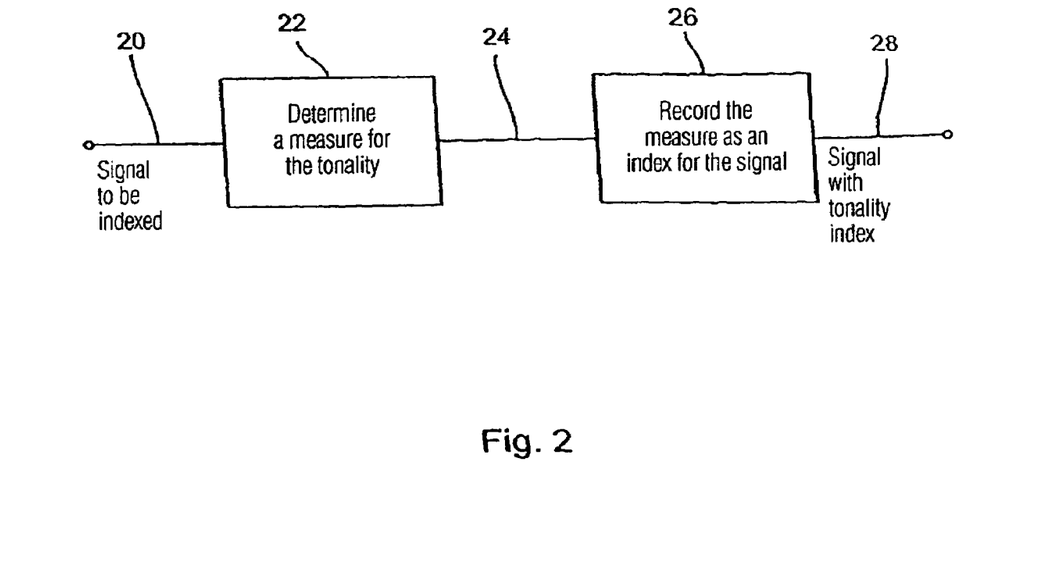
FIG. 2 shows a basic block diagram of a device for indexing a signal.

FIG. 2 shows a device for producing an indexed signal with an audio content. The signal, e.g. an audio piece which has been produced in the tone studio and which is stored on a compact disc, is fed into the device shown in FIG. 2 via an input 20. The unit 22, which in principle can be constructed exactly like the unit 12 of FIG. 1, determines a measure for the tonality of the signal to be indexed and supplies this measure to a unit 26 for recording the measure as the index for the signal via a connecting line 24. The signal which is fed in at the input 20, together with a tonality index, can then be output at an output of the unit 26 which is at the same time the output 28 of the device for producing an indexed signal shown in FIG. 2. Alternatively, the device shown in FIG. 2 could be so conceived that, at the output 28, a table entry is produced which combines the tonality index with an identification mark which is uniquely assigned to the signal to be indexed. Quite generally the device shown in FIG. 2 supplies an index for the signal, which index is assigned to the signal and refers to the audio content of the signal.

Figure 5:
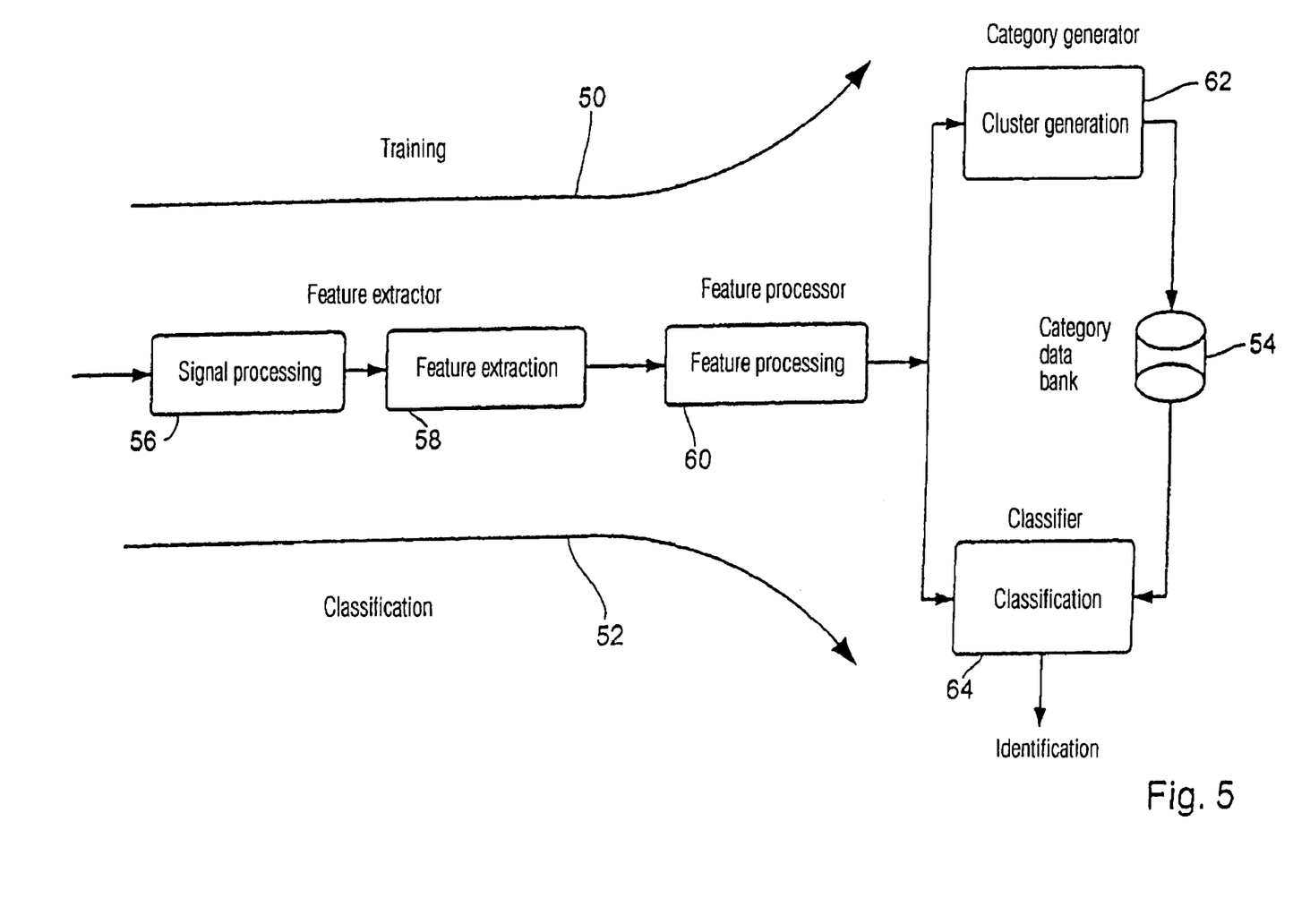
FIG. 5 shows a basic block diagram of a pattern recognition system in which the tonality measure can be used as the feature.

When a plurality of signals is processed by the device shown in FIG. 2, a data bank which can be used e.g. for the pattern recognition system shown in FIG. 5 is gradually created from indices for audio pieces. In addition to the indices, the data bank optionally stores the audio pieces themselves. In this way the pieces can be searched through immediately in respect of their tonality properties so as to identify and classify a piece by means of the device shown in FIG. 1 either as regards the tonality property or as regards similarities with other pieces or differences between two pieces. Generally, however, the device shown in FIG. 2 provides a possibility of producing pieces with an associated meta description, i.e. the tonality index. It is therefore possible to index and search through data records e.g. according to predetermined tonality indices, so that an efficient search and location of multimedia pieces is possible according to the present invention.

Figure 3:
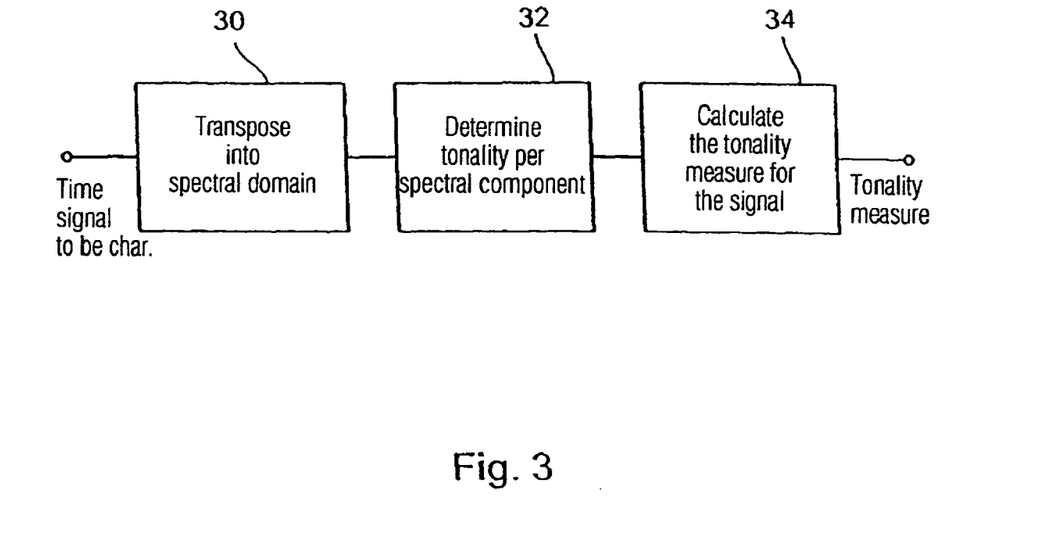
FIG. 3 shows a basic block diagram of a device for calculating the tonality measure from the tonality per spectral component.

Different methods can be used to calculate the tonality measure of a piece. As is shown in FIG. 3, a time signal which is to be characterized can be transposed into the spectral domain using a unit 30 so as to create a block of spectral coefficients from a block of temporal sampled values. As will be explained later, an individual tonality value can be determined for each spectral coefficient or each spectral component so as to classify a spectral component as tonal or non-tonal, e.g. via a yes/no decision. Using the tonality values, determined by the unit 32, for the spectral components and the energy or power of the spectral components, the tonality measure for the signal can then be calculated in a number of ways by means of a unit 34.

In view of the fact that a quantitative tonality measure is obtained, e.g. via the concept described in FIG. 3, it is also possible to cite differences or similarities between two tonality-indexed pieces. Pieces can be classified as similar if their tonality measures differ by less than a predetermined threshold, while other pieces can be classified as dissimilar if their tonality indices differ by more than a dissimilarity threshold. Apart from the difference between two tonality measures, other values can be used to determine the tonality difference between two pieces, e.g. the difference between two absolute values, the square of a difference, the quotient of two tonality measures minus 1, the correlation between two tonality measures, the distance metric between two tonality measures which are n-dimensional vectors, etc.

It should be noted that the signal to be characterized does not have to be a time signal, but could be e.g. an MP3-coded signal, which consists of a sequence of Huffman code words which have been created from quantized spectral values.

Figure 4:
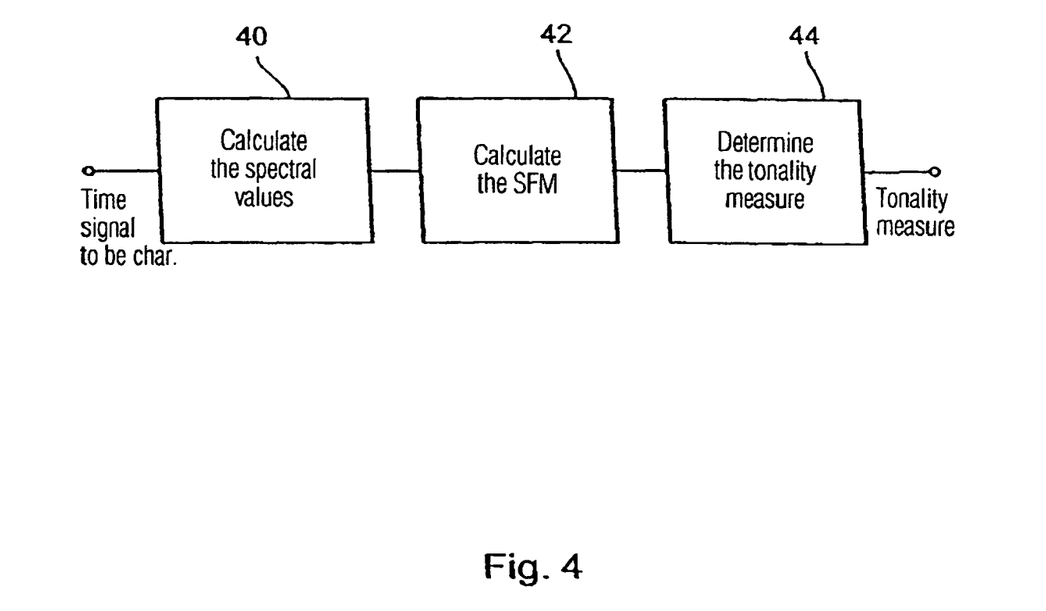
FIG. 4 shows a basic block diagram for determining the tonality measure from the spectral flatness measure (SFM)

The quantized spectral values were created from the original spectral values by quantization, the quantization being so chosen that the quantization noise introduced by quantization lies below the psychoacoustic masking threshold. As can be seen in the example shown in FIG. 4, in such a case the coded MP3 data stream can be used directly to calculate the spectral values using e.g. an MP3 decoder (unit 40 in FIG. 4). It is not necessary prior to determining the tonality to convert to the time domain and then to reconvert to the spectral domain. The spectral values calculated within the MP3 decoder can be used directly to calculate the tonality per spectral component or, as shown in FIG. 4, the SFM (SFM=spectral flatness measure) using the unit 42. If spectral components are used to determine the tonality, therefore, and if the signal to be characterized is an MP3 data stream, unit 40 is constructed like a decoder but without the inverse filter bank.

The measure for the spectral flatness (SFM) is calculated using the following equation:

$$SFM = \frac{\left[\prod_{n=0}^{N-1} X(n)\right]^{\frac{1}{N}}}{\frac{1}{N}\sum_{n=0}^{N-1} X(n)}$$

In this equation $X(n)$ represents the squared value of a spectral component with the index n, while N represents the total number of the spectral coefficients of a spectrum. From the equation it can be seen that the SFM is equal to the quotient of the geometric mean of the spectral components and the arithmetic mean of the spectral components. As is known, the geometric mean is always smaller than or at most equal to the arithmetic mean, so the value of the SFM lies between 0 and 1. A value near 0 indicates a tonal signal and a value near 1 indicates a signal of a noisy nature with a flat spectral profile. It should be noted that the arithmetic mean and the geometric mean are equal only when all the $X(n)$ are identical, which corresponds to a completely atonal, i.e. noisy or pulsed signal. If, in contrast, the magnitude of just one single spectral component is very large while the magnitudes of the other spectral components $X(n)$ are very small, an extreme case, the SFM will have a value near 0, indicating a highly tonal signal.

The SFM is described in "Digital Coding of Waveforms", Englewood Cliffs, N.J., Prentice-Hall, N. Jayant, P. Noll, 1984 and was originally defined as the measure for the maximum coding gain which can be attained from a redundancy reduction.

From the SFM the tonality measure can then be ascertained by a unit 44 for determining the tonality measure.

A further possibility for determining the tonality of the spectral values, which can be performed by a unit 32 of FIG. 3, consists in determining peaks in the power density spectrum of the audio signal, as described in MPEG-1 Audio ISO/IEC 11172-3, Annex D1 "Psychoacoustic Model 1". Here the level of a spectral component is ascertained. The levels of two spectral components enclosing the one spectral component are then determined. A spectral component is classified as tonal if the level of the spectral component is greater than the level of an enclosing spectral component by a predetermined factor. The predetermined threshold is taken to be 7 dB in the prior art, although, however, other arbitrary predetermined thresholds can be used. As a result, it can be stated for each spectral component whether this is tonal or not. The tonality measure can then be stated by the unit 34 of FIG. 3 using the tonality values for the individual components and the energy of the spectral components.

A further possibility of determining the tonality of a spectral component lies in the evaluation of the temporal predictability of the spectral component. Again reference is made to MPEG-1 Audio ISO/IEC 11172-3, Annex D2 "Psychoacoustic Model 2". In general a current block of sampled values of the signal to be characterized is converted to a spectral representation to produce a current block of spectral components. The spectral components of the current block of spectral components are then predicted using information from sampled values of the signal to be characterized which precede the current block, i.e. using past information. A prediction error is then determined from which the tonality measure can be derived.

A further possibility of determining the tonality is described in the U.S. Pat. No. 5,918,203. Here, too, a positive real-value representation of the spectrum of the signal to be characterized is used. This representation can comprise the magnitudes, the squares of the magnitudes, etc. of the spectral components. In one embodiment the magnitudes or squares of the magnitudes of the spectral components are first compressed logarithmically and then filtered with a filter with differentiating characteristic to obtain a block of differentially filtered spectral components.

In another embodiment the magnitudes of the spectral components are first filtered with a filter with differentiating characteristic to obtain a numerator and are then filtered with a filter with integrating characteristic to obtain a denominator. The quotient of the differentially filtered magnitude of a spectral component and the integrally filtered magnitude of the same spectral component then gives the tonality value for this spectral component.

By means of these two procedures slow changes between neighbouring spectral component magnitudes are suppressed, while abrupt changes between neighbouring spectral component magnitudes in the spectrum are emphasized. Slow changes between neighbouring spectral component magnitudes indicate atonal signal components, while abrupt changes indicate tonal signal components. The logarithmically compressed and differentially filtered spectral components, or the quotients, can then be used to calculate a tonality measure for the observed spectrum.

Although it was implied in the previous text that a tonality value is calculated per spectral component, it is preferable from the point of view of a reduced computational effort to e.g. always add the squares of the magnitudes of two neighbouring spectral components and then for each result of the addition to calculate a tonality value using one of the cited methods. Any type of additive grouping of the squares of magnitudes or of the magnitudes of spectral components can be used to calculate tonality values for more than one spectral component.

Another possibility for determining the tonality of a spectral component is to compare the level of a spectral component with the mean value of spectral component levels in a frequency band. The width of the frequency band within which the spectral component falls whose level is being compared with the mean value e.g. of the magnitudes or the squares of the magnitudes of the spectral components can be selected according to requirements. One possibility is to choose a narrow band. Alternatively a broad band could be chosen or a band according to psychoacoustic considerations. In this way the influence of short-term power reductions in the spectrum can be minimized. Although the tonality of an audio signal has been determined in terms of its spectral components in the foregoing, this can also take place in the time domain, i.e. using the sampled values of the audio signal. An LPC analysis of the signal could be performed so as to estimate a prediction gain for the signal. The prediction gain is inversely proportional to the SFM and is equally a measure for the tonality of the audio signal.

In a preferred embodiment, instead of one value per short-time spectrum the tonality measure is a multidimensional vector of tonality values. The short-time spectrum can e.g. be subdivided into four contiguous and preferably non-overlapping sections or frequency bands for each of which a tonality value is ascertained by e.g. the unit 34 of FIG. 3 or the unit 44 of FIG. 4. This results in a 4-dimensional tonality vector being obtained for a short-time spectrum of the signal to be characterized. To enable a better characterization to be obtained, an additionally preferential arrangement was that where e.g. four short-time spectra are processed as described above, thus resulting in a tonality measure which is a 16-dimensional vector or, in general, an n x m-dimensional vector, where n stands for the number of tonality components per frame or block of sampled values and m stands for the number of observed blocks or short-time spectra. The tonality measure would then be, as has been explained, a 16-dimensional vector. To take better account of the time profile of the signal to be characterized, an additionally preferred arrangement is one where a number of such e.g. 16-dimensional vectors are calculated and are then statistically processed in order to calculate e.g. the variance, mean value or central moments of higher order from the n x m-dimensional tonality vectors of a piece of a certain length so as to index the piece in this way.

Speaking generally, the tonality can thus be calculated from parts of the total-spectrum. It is therefore possible to determine the tonality/noisiness of a partial spectrum or several partial spectra and thus to achieve a finer characterization of the spectrum and thus of the audio signal.

Furthermore, from tonality values such as e.g. mean value, variance and central moments of higher order, short-time statistics can be calculated as the measure of tonality. These are ascertained by means of statistical techniques using a temporal sequence of tonality values or tonality vectors and they therefore provide an essence over a longish section of a piece.

In addition, differences in temporally sequential tonality vectors or linearly filtered tonality values can be used, possible linear filters being e.g. IIR filters or FIR filters.

In the calculation of the SFM (block 42 in FIG. 4), too, to save computation time it is preferable to add e.g. the squares of the magnitudes of two neighbours in the frequency domain or to form their mean value and to perform the SFM calculation on the basis of this coarser positive and real-value spectral representation. This also leads to better robustness as regards narrow-band frequency outages and to a reduced computational effort.

In the following reference will be made to FIG. 5, which shows a schematic overview of a pattern recognition system within which the present invention can be employed to advantage. In principle in a pattern recognition system shown in FIG. 5 a distinction is made between two operation modes, the training mode 50 and the classification mode 52.

In the training mode data are "trained in", i.e. fed into the system and then stored in a data bank 54.

In the classification mode an attempt is made to compare a signal to be characterized with the entries in the data bank 54 and to classify it. The device according to the present invention shown in FIG. 1 can be used in the classification mode 52 if tonality indices of other pieces are available with which the tonality index of the current piece can be compared in order to make a statement about the piece. The device shown in FIG. 2, on the other hand, is employed to advantage in the training mode 50 of FIG. 5 so as to gradually fill the data bank.

The pattern recognition system includes a unit 56 for signal preprocessing, a post-circuited unit 58 for feature extraction, a unit 60 for feature processing, a unit 62 for a cluster generation, and a unit 64 for performing a classification to obtain e.g. as a result of the classification mode 52 such a statement about the content of the signal to be characterized as that the signal is identical to the signal xy which has been trained-in in an earlier training mode.

In the following the functionality of the individual blocks of FIG. 5 will be considered.

The block 56 together with the block 58 forms a feature extractor while the block 60 constitutes a feature processor. The block 56 converts an input signal to a uniform target format, e.g. the number of channels, the sampling rate, the resolution (in bits per sampled value), etc. This is sensible and necessary in as much as no assumptions should be made as to the source from which the input signal originates.

The unit 58 for feature extraction serves to restrict the normally large amount of information at the output of the unit 56 to a small amount of information. The signals to be investigated normally have a high data rate, i.e. a large number of sampled values per time section. Restricting to a small amount of information must occur in such a way that the essence of the original signal, i.e. the intrinsic nature of the signal, does not get lost. In the unit 58 prescribed characteristic properties, in general e.g. loudness, fundamental frequency, etc., and/or tonality features or the SFM are extracted from the signal. The tonality features gained in this way are meant to contain the essence of the investigated signal.

In the block 60 the previously calculated feature vectors can be processed. A simple act of processing is the normalization of the vectors. Possible feature processing includes linear transformations, such as e.g. the Karhunen-Loeve transformation (KLT) or linear discriminant analysis (LDA), which are known in this field of technology. Further, and in particular also non-linear, transformations are likewise applicable to feature processing.

The category generator serves to group the processed feature vectors into categories. These categories correspond to a compact representation of the associated signal. The classifier 64, finally, serves to assign a generated feature vector to a predefined category or to a predefined signal.

The following table provides an overview of recognition rates under various conditions.

| Type of distortion | Recognition rate (loudness as feature) | Recognition rate (SFM as feature) |
| --- | --- | --- |
| MP3 coding, 96 kbps, 30 s period | 83.9% | 100% |
| MP3 coding, 96 kbps, 15 s period | 76.1% | 74.1% |

The table represents recognition rates using a data bank (54) of FIG. 5 with a total of 305 music pieces, the first 180 seconds of each of which were trained in as reference data. The recognition rate gives the number of pieces properly recognized (as a percentage) in relation to the influence of the signal. The second column represents the recognition rate when the loudness is used as the feature. In particular the loudness was calculated in four spectral bands, after which the loudness values were expressed logarithmically and the differences between the logarithmic loudness values for temporally successive spectral bands were formed. The result thus obtained was used as the feature vector for the loudness.

In the final column the SFM for four bands was used as the feature vector.

It can be seen that the use according to the present invention of the tonality as the classification feature leads to a 100% recognition rate for MP3 coded pieces when a period of 30 s is considered, whereas the recognition rate both for the feature according to the present invention and also when the loudness is the feature decreases when shorter periods (e.g. 15 s) of the signal to be investigated are used for recognition.

As has already been explained, the device shown in FIG. 2 can be used to train the recognition system shown in FIG. 5. Quite generally, however, the device shown in FIG. 2 can be used to generate meta descriptions, i.e. indices, for all multimedia data records, so that it is possible to search through data records from the point of view of their tonality values or to supply from a data bank data records which have a particular tonality vector or which are similar to a particular tonality vector.

The features according to the present invention, which provide a measure for the tonality of the signal either directly or after particular processing, are defined as follows:

$$F_{x;y} = \frac{\sqrt[x]{\frac{1}{N}\sum_{n=0}^{N-1} X(n)^x}}{\sqrt[y]{\frac{1}{N}\sum_{n=0}^{N-1} X(n)^y}}$$

In the above equation X(n) is the discrete power density spectrum, which consists of individual spectral components, which is calculated e.g. by the 2N-point discrete Fourier transform (DFT). The parameters, or powers x and y, determine the characteristic with which high signal peaks are emphasized in comparison with smaller components in both the numerator and denominator. To obtain a meaningful quotient $F_{x;y}$ from the mean of the summed values in the numerator and the mean of the summed values in the denominator, the powers x and y must be chosen to be different from each other. For a flat power density spectrum, i.e. a "noisy" signal, $F_{x;y}=1$. For tonal signals, on the other hand, $F_{x;y}>1$ if x and y are so chosen that x>y. When x and y are so chosen that x<y, the quotient has a value $F_{x;y}$ lying between 0 and 1.

Due to the fact that no pure products have to be calculated, the features according to the present invention, which can be obtained through different parameters x and y, require only a modest computational effort for extraction. Since only squares, third powers, fourth powers, more generally nth powers, have to be formed, and these exponentiated spectral components are then summed, problems which arise when pure products are calculated are avoided. To remain in the numerically available number space in the case of large products, logarithms are formed, the logarithms are summed, and the sum obtained is then exponentiated. This is complicated and is avoided for the tonality features according to the present invention.

Furthermore it was established that the features exhibit a high robustness, particularly in the face of limited signal changes such as a change in the signal sampling rate. The change in the signal sampling rate might be the result of a tape or a record being played somewhat faster or slower, leading to a dilation or compression of the spectrum.

It should be noted that the features according to the present invention can be employed on a frequency band basis. Here the spectral space of the audio signal can be subdivided into non-overlapping bands of the same size or into at least partly logarithmically weighted bands. Here the logarithmic weighting of the width of the frequency bands corresponds relatively well to the division of the psychoacoustic bands, particularly towards higher frequencies from a lower threshold frequency onwards.

To improve still further the robustness as regards changes in the signal sampling rate, an additional preference is to implement the frequency band division of the audio signal not with non-overlapping bands but with bands which overlap by between 5 and 10%. This has the advantage that while a spectral component would fall within another frequency band if there were no overlapping, this spectral component still falls within the same frequency band as a result of overlapping and contributes to the same tonality feature as before.

Various special cases can be realized by suitable choice of the powers x and y, the special case where x is equal to 2 and y is equal to 1 being especially noteworthy. The quotient for the measure of the tonality according to the present invention then corresponds to the quotient of the quadratic mean value (numerator of the quotient) and the arithmetic mean value (denominator of the quotient). The quadratic mean value is also known to persons skilled in the art as the RMS="root mean square".

It should be noted that as the powers get larger in the numerator and denominator, larger spectral components are emphasized compared with smaller spectral components. Depending on the application and the desired range for the value of the quotient, different intervals between the power x of the numerator and the power y of the denominator can be chosen. The greater the difference between x and y is, the greater will be the values of the quotient when x is greater than y. A quantitative statement concerning the tonality measure on the basis of the quotient according to the present invention will therefore have to take into account the values x and y or the interval between them.

Finally, it should be noted that the measure for the tonality of the quotient according to the present invention can be direct if a very marked characterization of the signal is desired. To obtain a more compact representation, preference is further given to the use of the mean value and/or the variance of a plurality of quotients of temporally successive blocks or a plurality of successive, temporally or in respect of frequency, frequency bands as the measure of the tonality of the signal. If a frequency-band-based quotient calculation is performed, and performed for a plurality of temporally successive blocks, a frequency-band-based combination of the quotients can be effected by forming the mean value and/or the variance, so that the measure for the tonality of the signal contains a statement on e.g. five successive blocks and e.g. ten frequency bands. The measure for the tonality is thus a vector wherein each row of the vector refers to a plurality of temporally successive blocks and in particular to a frequency band of the audio signal for the plurality of temporally successive blocks.

The invention claimed is:

1. A method for characterizing an audio signal representing an audio content, comprising:

determining a measure for a tonality of the audio signal; and making a statement about the audio content of the audio signal on the basis of the measure for the tonality of the audio signal, wherein the measure for the tonality is derived from a quotient $F_{x,y}$ which is defined as follows:

$$F_{x,y} = \frac{\sqrt[x]{\frac{1}{N}\sum_{n=0}^{N-1} X(n)^x}}{\sqrt[y]{\frac{1}{N}\sum_{n=0}^{N-1} X(n)^y}}$$

wherein X(n) is a spectral component of the audio signal for a numeration index n, wherein n equal to 0 represents a lower frequency index, wherein N represents an upper frequency index, wherein x is the first power and y the second power and wherein the first and second powers are different.

2. A method according to claim 1, wherein the first power x is greater than the second power y and wherein a quotient value greater than "1" indicates a tonal audio signal.

3. A method according to claim 1, wherein the first power x is smaller than the second power y and wherein a quotient value smaller than "1" and greater than "0" indicates a tonal audio signal.

4. A method according to claim 1, wherein the first power x is equal to 2 and the second power y is equal to 1, such that the quotient of the quadratic mean value and the arithmetic mean value of spectral components of the audio signal serves to derive the measure for the tonality.

5. A method according to claim 1, wherein the quotient is calculated using all the spectral components of the audio signal.

6. A method according to claim 1, wherein the quotient is calculated using some of the spectral components of the audio signal.

7. A method according to claim 6, wherein at least two quotients are calculated for a spectrum of the audio signal, the quotients being calculated using spectral components which differ at least partly.

8. A method according to claim 1, wherein the step of making a statement comprises the following steps:

comparing the measure for the tonality of the audio signal with a plurality of known tonality measures for a plurality of known audio signals representing different audio contents; and establishing whether the audio content of the audio signal to be characterized agrees with the content of a known audio signal when the tonality measure of the audio signal to be characterized differs from the tonality measure assigned to the known audio signal by less than a predetermined amount.

9. A method according to claim 8, which includes the following additional step:

supplying a title, an author or other meta information for the audio signal to be characterized when a match is found.

10. A method according to claim 1, wherein the measure for the tonality is a quantitative value and where the method also includes the following steps:

calculating a tonality distance between the determined measure for the tonality of the audio signal and a known tonality measure for a known audio signal; and quoting a similarity measure for the audio signal to be characterized, said similarity measure depending on the tonality distance and representing the similarity of the content of the known audio signal to the content of the audio signal to be characterized.

11. A method according to claim 1, wherein the audio signal to be characterized is derived from an original audio signal by coding, said coding exhibiting a blockwise conversion of the original audio signal into the frequency domain and a quantization of spectral values of the original audio signal under the control of a psychoacoustic model.

12. A method according to claim 1, wherein the audio signal to be characterized is provided by emitting an original audio signal by means of a loudspeaker and receiving it by means of a microphone.

13. A method according to claim 1, wherein the audio signal to be characterized contains a measure for the tonality as additional information, and wherein the step of determining includes reading the measure for the tonality from the additional information.

14. A method according to claim 1, wherein at least two neighboring spectral components in the frequency domain are grouped together and it is these grouped spectral components and not the individual spectral components which are then processed further.

15. A method according to claim 1, wherein in the step of determining a short-time spectrum of the audio signal to be characterized is subdivided into n bands and a tonality value is determined for each band, wherein also for each of m successive short-time spectra of the audio signal to be characterized n tonality values are determined, and wherein a tonality vector with a dimension m x n is formed, where m and n are greater than or equal to 1.

16. A method according to claim 15, wherein the measure for the tonality is the tonality vector or a statistical value from a plurality of temporally successive tonality vectors of the audio signal to be characterized and the statistical value is a mean value, a variance or a central moment of higher order or a combination of the cited statistical values.

17. A method according to claim 15, wherein the measure for the tonality is derived from a difference between a plurality of tonality vectors or a linear filtering of a plurality of tonality vectors.

18. A method for producing an indexed audio signal which has an audio content, comprising:
   determining a measure for a tonality of the audio signal; and
   recording the measure for the tonality as the index associated with the audio signal, said index indicating the audio content of the audio signal,
   wherein the measure for the tonality is derived from a quotient $F_{x;y}$ which is defined as follows:

$$F_{x;y} = \frac{\sqrt[x]{\frac{1}{N}\sum_{n=0}^{N-1} X(n)^x}}{\sqrt[y]{\frac{1}{N}\sum_{n=0}^{N-1} X(n)^y}}$$

wherein X(n) is a spectral component of the audio signal for a numeration index n, wherein n equal to 0 represents a lower frequency index, wherein N represents an upper frequency index, wherein x is the first power and y the second power and wherein the first and second powers are different.

19. A method according to claim 18, wherein the step of determining a measure for the tonality comprises the following steps:
   calculating tonality values for different spectral components or groups of spectral components of the audio signal;
   processing the tonality values to obtain the measure for the tonality; and allocating the audio signal to an audio signal category on the basis of the measure for the tonality.

20. A method according to claim 18, which is performed for a plurality of audio signals to obtain a data bank consisting of references to the plurality of audio signals together with the assigned indices, which indicate tonality properties of the audio signals.

21. A device for characterizing an audio signal representing an audio content, comprising:
   a unit for determining a measure for a tonality of the audio signal; and
   a unit for making a statement about the audio content of the audio signal on the basis of the measure for the tonality of the audio signal,
   wherein the measure for the tonality is derived from a quotient $F_{x;y}$ which is defined as follows:

$$F_{x;y} = \frac{\sqrt[x]{\frac{1}{N}\sum_{n=0}^{N-1} X(n)^x}}{\sqrt[y]{\frac{1}{N}\sum_{n=0}^{N-1} X(n)^y}}$$

wherein X(n) is a spectral component of the audio signal for a numeration index n, wherein n equal to 0 represents a lower frequency index, wherein N represents an upper frequency index, wherein x is the first power and y the second power and wherein the first and second powers are different.

22. A device for producing an indexed audio signal which has an audio content, comprising:
   a unit for determining a measure for a tonality of the audio signal; and
   a unit for recording the measure for the tonality as the index associated with the audio signal, said index indicating the audio content of the audio signal,
   wherein the measure for the tonality is derived from a quotient $F_{x;y}$ which is defined as follows:

$$F_{x;y} = \frac{\sqrt[x]{\frac{1}{N}\sum_{n=0}^{N-1} X(n)^x}}{\sqrt[y]{\frac{1}{N}\sum_{n=0}^{N-1} X(n)^y}}$$

wherein X(n) is a spectral component of the audio signal for a numeration index n, wherein n equal to 0 represents a lower frequency index, wherein N represents an upper frequency index, wherein x is the first power and y the second power and wherein the first and second powers are different.

* * * * *